United States Patent
Thompson

(10) Patent No.: US 8,256,198 B2
(45) Date of Patent: Sep. 4, 2012

(54) AUTOMATICALLY STEERED GEARBOXES FOR AN IMPLEMENT WITH A PIVOTING TONGUE

(75) Inventor: Kent L. Thompson, Otley, IA (US)

(73) Assignee: Forage Innovations B.V., Pa Maassluis (NL)

( * ) Notice: Subject to any disclaimer, the term of this patent is extended or adjusted under 35 U.S.C. 154(b) by 0 days.

(21) Appl. No.: 13/045,712

(22) Filed: Mar. 11, 2011

(65) Prior Publication Data

US 2011/0219738 A1    Sep. 15, 2011

Related U.S. Application Data

(60) Provisional application No. 61/313,419, filed on Mar. 12, 2010.

(51) Int. Cl.
*A01D 34/00* (2006.01)
(52) U.S. Cl. .......................... 56/15.3; 280/494; 180/53.3
(58) Field of Classification Search .................. 280/494, 280/416.2, 492; 180/53.1, 53.3, 53.6; 172/248, 172/449, 439, 678, 74, 125; 56/15.3, 15.5, 56/15.8
See application file for complete search history.

(56) References Cited

U.S. PATENT DOCUMENTS

| | | | |
|---|---|---|---|
| 4,366,877 A | 1/1983 | Vissers | |
| 4,723,396 A * | 2/1988 | Ermacora | 56/13.6 |
| 5,060,462 A * | 10/1991 | Helfer et al. | 56/14.9 |
| 5,094,063 A * | 3/1992 | Wattron et al. | 56/6 |
| 5,107,663 A * | 4/1992 | Wattron et al. | 56/15.7 |
| 5,355,971 A | 10/1994 | Austin | |
| 5,531,283 A | 7/1996 | Austin | |
| 5,566,535 A | 10/1996 | Pruitt | |
| 5,706,901 A | 1/1998 | Walters | |
| 5,901,533 A * | 5/1999 | Ermacora et al. | 56/6 |
| 6,003,291 A * | 12/1999 | Ermacora et al. | 56/6 |
| 6,055,800 A * | 5/2000 | Walch | 56/16.7 |
| 6,412,570 B1 | 7/2002 | Pruitt | |
| 6,655,118 B1 * | 12/2003 | Thompson et al. | 56/15.8 |
| 6,776,432 B2 | 8/2004 | Harkcom | |
| 7,207,166 B2 * | 4/2007 | Stephenson | 56/15.2 |
| 7,213,488 B2 * | 5/2007 | Daniel | 74/665 H |

(Continued)

FOREIGN PATENT DOCUMENTS

EP        0429383        5/1991

(Continued)

OTHER PUBLICATIONS 2 pages from a website, showing a "Patented Double Swivel Gear Box Hitch for Smooth Operation and Sharp Turning" on p. 2—by Kelley Manufacturing Co.

*Primary Examiner* — Arpad Fabian-Kovacs
(74) *Attorney, Agent, or Firm* — Sturm & Fix LLP

(57) ABSTRACT

A mower is suspended from a frame and includes a header with a cutter. A tongue is pivotally connected to the mower frame and is moveable with respect to the frame by a hydraulic cylinder. At the front of the tongue is a front gearbox rigidly attached to the tongue. The front gearbox transmits rotary power from the power take off of the tractor to a rear gearbox pivotally attached the header and from the rear gearbox rotary power is passed on ultimately to the rotary cutting units. Pivoting of the rear gearbox is controlled by a steering connection operatively attached between the front and rear gearboxes.

29 Claims, 17 Drawing Sheets

U.S. PATENT DOCUMENTS

| | | | |
|---|---|---|---|
| 7,658,056 B2 * | 2/2010 | Thompson et al. | 56/15.8 |
| 7,726,109 B2 | 6/2010 | Thompson | |
| 7,743,595 B2 * | 6/2010 | Savoie et al. | 56/341 |
| 7,966,794 B2 * | 6/2011 | Thompson et al. | 56/15.8 |
| 2003/0140610 A1 | 7/2003 | Boyko | |
| 2005/0161905 A1 | 7/2005 | Chalancon | |
| 2010/0132325 A1 * | 6/2010 | Thompson et al. | 56/15.3 |
| 2011/0047948 A1 * | 3/2011 | Thompson | 56/17.1 |

FOREIGN PATENT DOCUMENTS

| | | |
|---|---|---|
| EP | 0823199 | 2/1998 |
| WO | 03/075635 | 9/2003 |

* cited by examiner

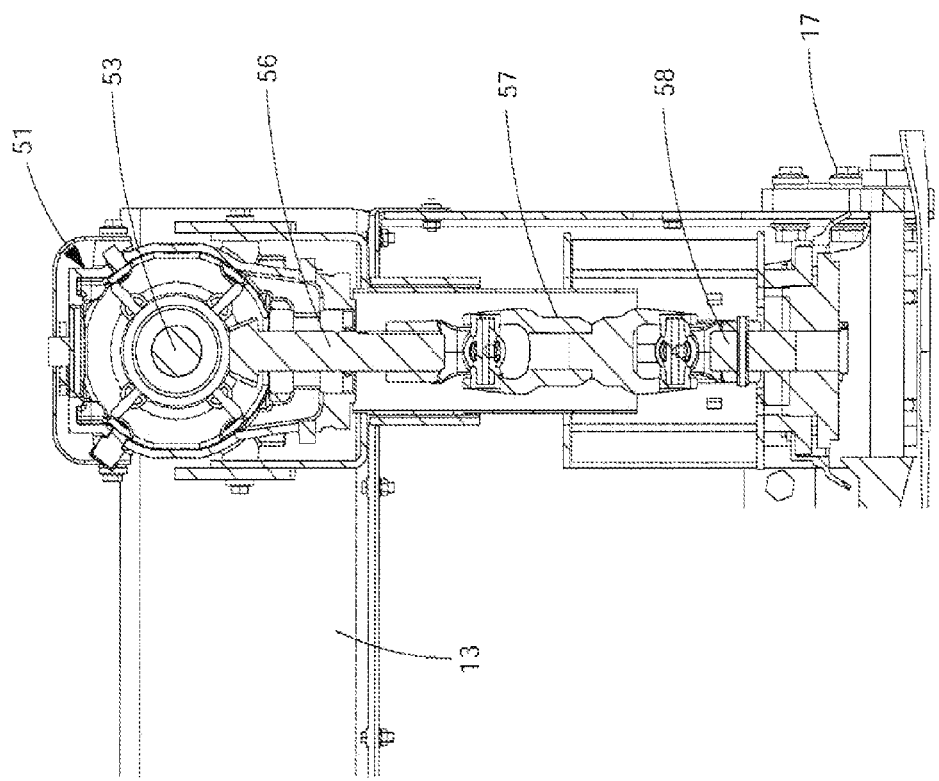

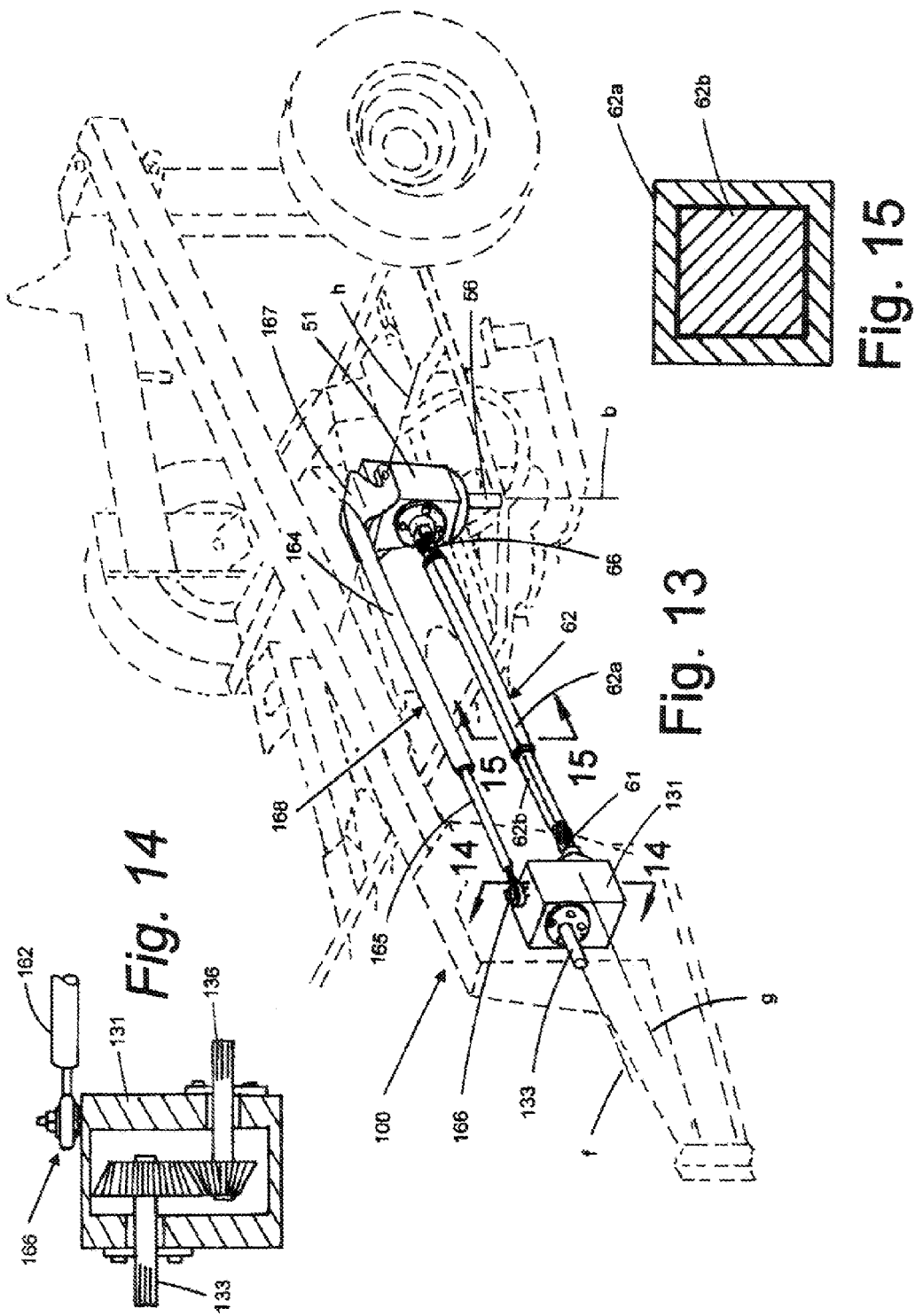

AUTOMATICALLY STEERED GEARBOXES FOR AN IMPLEMENT WITH A PIVOTING TONGUE

CROSS-REFERENCE TO RELATED APPLICATIONS

This application claims the benefit of U.S. Provisional Patent Application Ser. No. 61/313,419 filed Mar. 12, 2010 entitled "Automatically Steered Gearboxes for a Mower with a Pivoting Tongue" which is incorporated by reference herein in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to crop harvesting equipment and, more particularly, to pull-type mowers or mower/conditioners having a pulling tongue which is hydraulically swingable from side-to-side so that the lateral position of the machine relative to the towing tractor can be adjusted on-the-go from the tractor seat. More particularly, the present invention involves a swing tongue harvester of the aforementioned type wherein provision is made for driving the operating components of the harvesting header, such as the crop severing mechanism and the conditioner rolls, through mechanical structures coupled with the power takeoff shaft of the towing vehicle, rather than through a hydraulic drive system.

2. Background of the Invention

Swing-tongue harvesters have become extremely popular over the years due in part to their ability to be quickly and easily maneuvered from the tractor seat around obstacles, through right angle turns, and otherwise operated in a manner previously reserved only for self-propelled vehicles. In the case of swing-tongue harvesters in which the tongue is pivoted about the frame, the machine is capable of being used to be positioned in an operative position behind a towing tractor to one side of the tractor when the mower is being used to cut a crop and a transport position wherein the machine is behind the towing tractor for transporting the machine from place to place. However, having a pulling tongue which is shifted between relatively sharp angular positions creates problems in the delivery of driving power from the tractor to operating components of the machine.

Accordingly, there is a need to provide solutions for the aforementioned problems.

BRIEF SUMMARY OF THE INVENTION

The present invention relates to a mowing and/or conditioning machine with pivoting steered gearboxes. The design contemplated in FIGS. 1-16 provides a mower conditioner having a header that is suspended from a frame and includes a plurality of cutting blades laterally disposed relative to the ground and conditioning rollers at the back end. The mower includes a tongue connecting the mower to a towing unit. The tongue is pivotally connected to the mower frame. At the front portion of the tongue is an upper tongue swivel gearbox, gearbox one, rigidly attached to the tongue which transmits rotary power from the power take off of the tractor to a lower tongue swivel gearbox, gearbox two, located directly below and pivotally attached to gearbox one. Gearbox two is attached to the front end of a telescoping driveline that is attached, at its rear end, to the input shaft of a rear gearbox, gearbox three. The output shaft of gear box three is connected a drive shaft that is attached to the rotary cutting units.

Gearbox three is mounted to the mower frame, beneath and at the rear of the tongue, with a pivoting arrangement, so that the gearbox housing and input shaft can pivot about the axis of its output shaft.

The pivoting rear gearbox three is attached to the header frame with the input shaft connected at a U-joint to the output end of a telescopic drive line section. The other end of the telescopic drive line section is connected at another U-joint located forward from the mower header along and below the tongue. At this forward U-joint, the telescopic drive line section connects with a gearbox two that is connected to the gearbox one above gearbox two. Gearbox one is connected to a forward section of drive line that is operatively connected to the power takeoff of the tractor.

In the preferred embodiment of FIGS. 1-12, also extending around the telescoping drive line and between the U-joints located between the pivoting gearbox two and the pivoting gearbox three are telescoping steering cylinders. These telescoping cylinders also serve as a guard to keep operators from becoming tangled in the driven shaft which extends between the two aforementioned U-joints. As shown in the drawings, the telescoping steering cylinders attach at one end to the U-joint adjacent the pivoting rear gear box structure three and at the opposite end to the U-joint on the other (front) end of the drive line connection, where it connects to forward lower gearbox two.

A second embodiment shown in FIGS. 13-15 has a pivoting rear gearbox on the header as a simple right angle gearbox that pivots along a vertical axis and is steered by a front gearbox that is operatively fixed to the tongue. A primary advantage to both concepts is to minimize the u-joint angles in the drive system.

A third embodiment shown in FIG. 16 utilizes the driveline arrangement of the first embodiment, with a different configuration of the tongue and mower header, in a center pivot arrangement, where the tongue is connected to the middle of the machine, and the mower is able to swing off to either side, to mow on either side of the towing unit.

One aspect of the present invention is the arrangement of the tongue and the driveline with a swivel gear box assembly, the combination of gearboxes one and two, mounted at the front portion of the tongue. This combination allows the towing forces to remain contained in the tongue, not transferred through the gearboxes, while providing a driveline with the capability of allowing various angles of operation.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 5c is a cross sectional view taken along line 5C-5C of FIG. 1 showing not only the rear gearbox and the drive train from it to the cutter bar but also the header assembly, gearbox mount, a cage to protect the crop from wrapping around a spinning double U-joint and a tubular structures for enclosing the drive train from the rear gearbox to the cage;

FIG. 13 is a perspective view of an alternate embodiment similar to FIGS. 11 and 12, except that the front and rear gearbox assemblies have been changed to a simplified design and those new gearbox assemblies, the gearbox steering device and the driveline between the front and rear gearboxes are all that is shown;

FIG. 14 is a cross sectional view taken along line 14-14 of FIG. 13 showing the two meshing gears and the input and output shafts of the front gearbox;

FIG. 15 is a cross sectional view taken along line 15-15 of FIG. 13 showing two telescoping parts of the drive shaft.

DETAILED DESCRIPTION OF THE INVENTION

Figure 1:
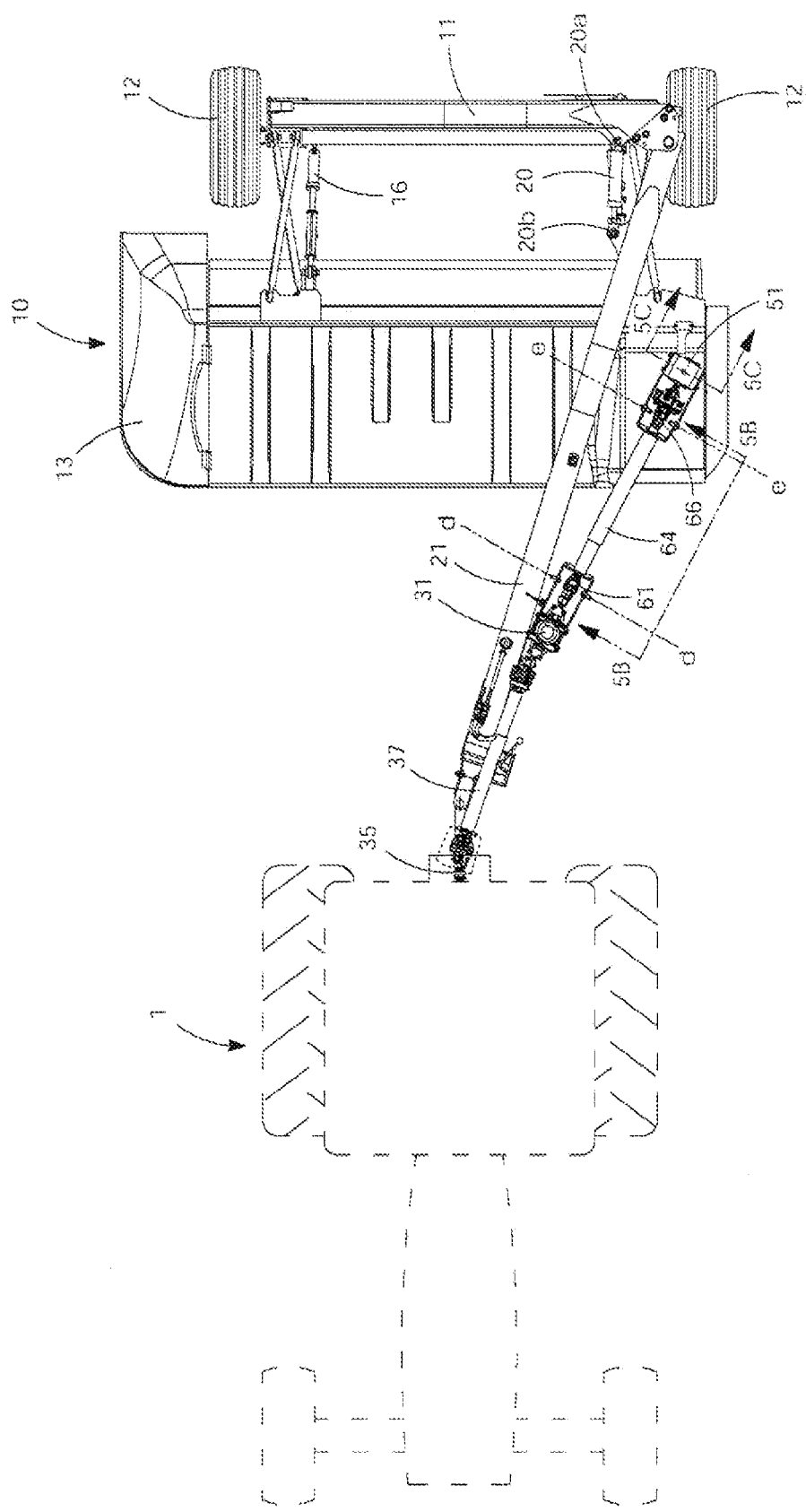
FIG. 1 is a top view of a preferred embodiment of the present invention attached to a towing tractor in the transport position thereof with the tongue swung in so the mower/conditioner follows behind the towing tractor.

Referring now to the drawings, wherein like reference numerals designate identical or corresponding parts throughout the several views, FIG. 1 shows a mower (10) with automatically steered gearboxes including a frame (11) with wheels (12) operatively attached thereto for permitting the frame (11) to be towed from place to place.

Figure 4:
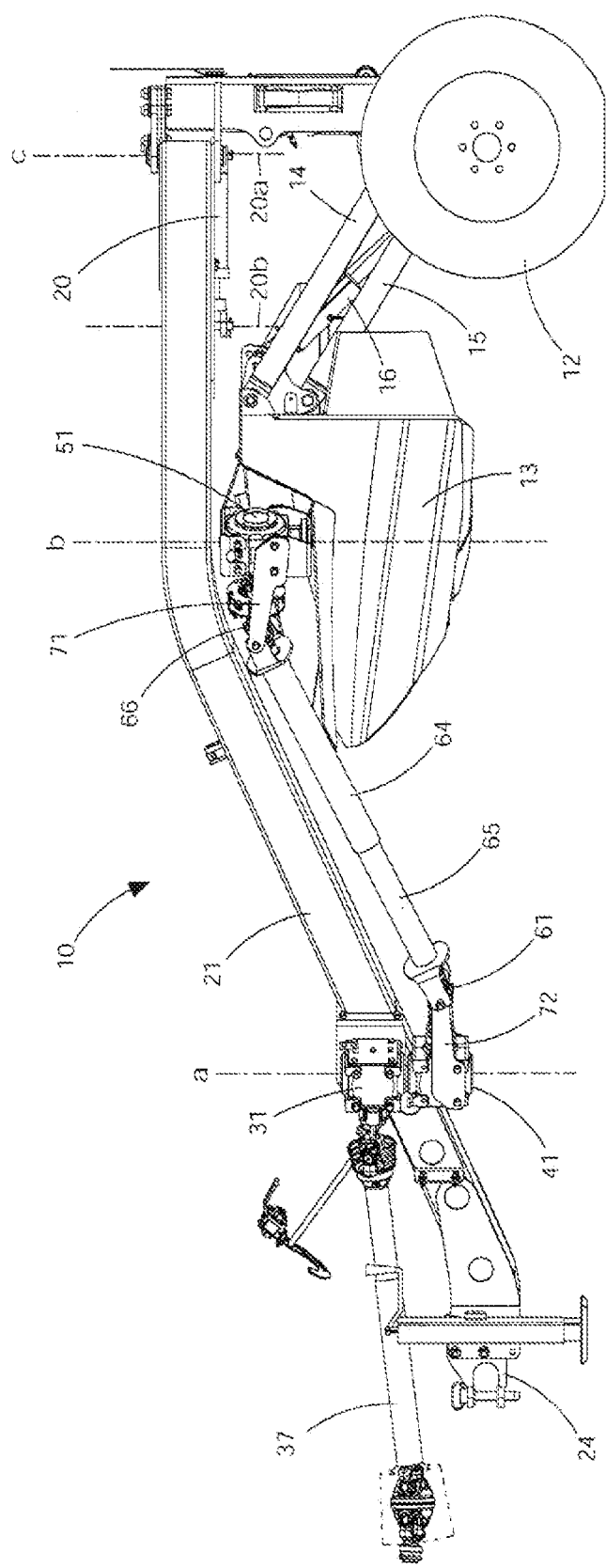
FIG. 4 is a left side elevational view with the tongue swung in and the cutter bar raised.

A header (13) is operatively attached to the frame (11) by top links (14) and bottom links (15) for example in the way shown in U.S. Pat. No. 7,726,109 in FIGS. 8-12b, which patent is incorporated herein in its entirety. Hydraulic cylinders (16) attached to the frame (11) and the header (13) in the way disclosed in U.S. Pat. No. 7,726,109 are used to raise or lower the header (13) with respect to the frame (11) for example between the raised position shown in FIG. 4 and the lowered position shown in FIG. 5.

Figure 5:
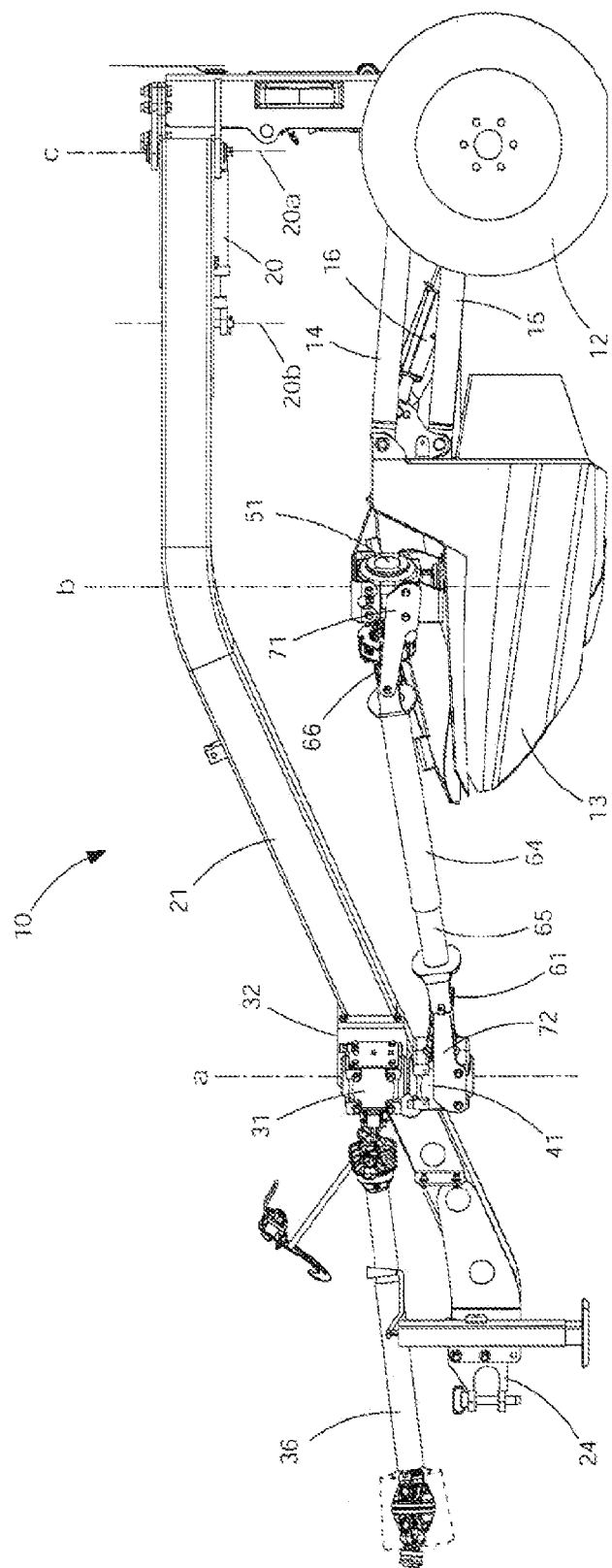
FIG. 5 is a left side elevational view with the tongue swung in and the cutter bar lowered.
Figure 5A:
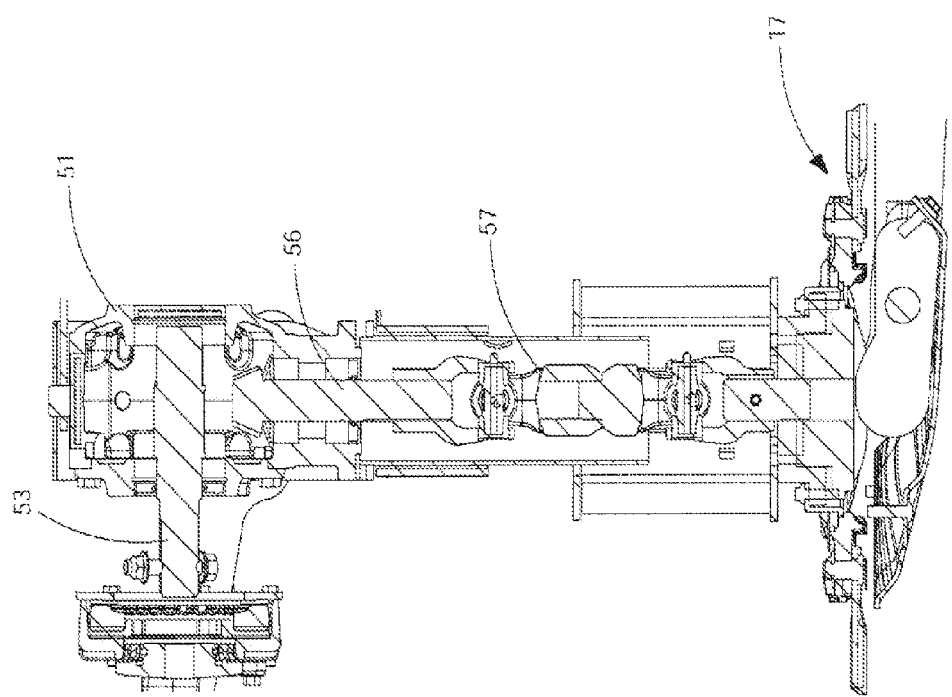
FIG. 5a is a cross sectional view taken along vertical axis b of FIG. 5 showing the rear gearbox and the drive train from it to the cutter bar.

Cutters (17) are operatively rotatably attached to the header (13) in the way shown in FIGS. 5a and 5c for cutting plants off a short distance above the ground.

Figure 2:
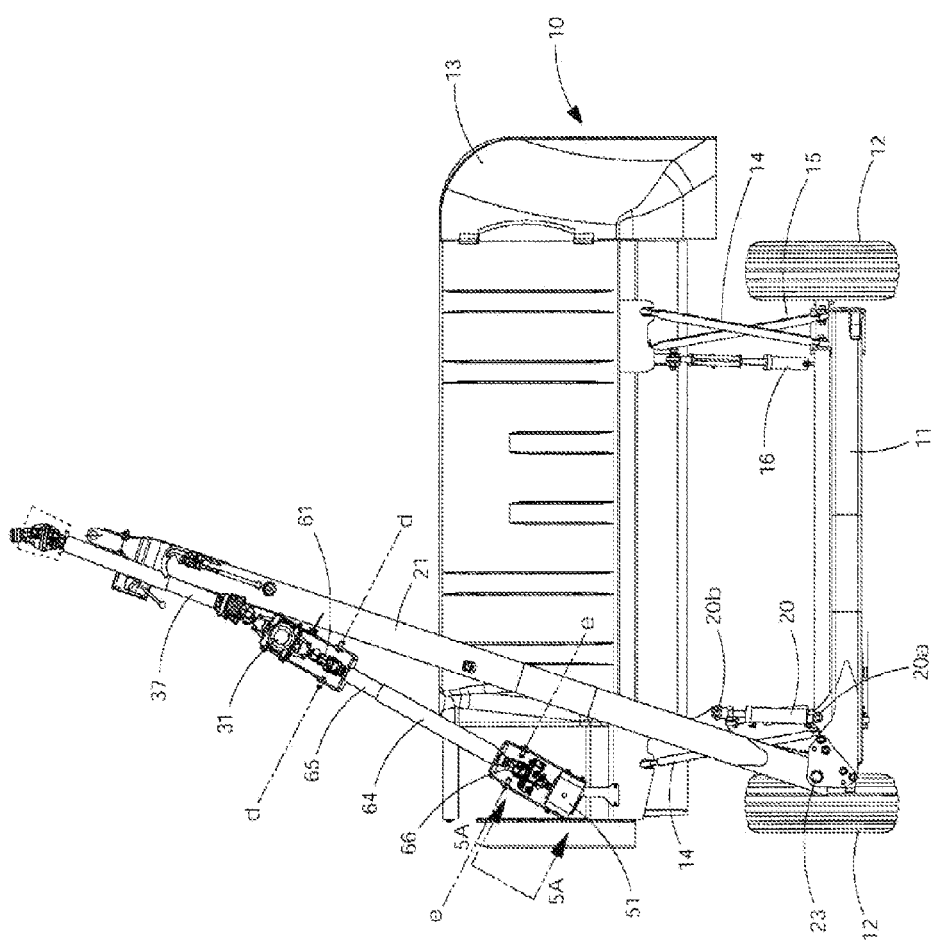
FIG. 2 is an enlarged view like FIG. 1 shown without the towing vehicle.

A tongue (21) is operatively pivotally attached along a first substantially vertical axis c as shown in FIG. 5 by a bracket (22) and pin (23) to the frame (11) at one end thereof and adapted to be attached to a prime mover (1) at the other end thereof by use of a hitch (24);

A hydraulic actuator (16) is operatively attached to the frame (11) and is operatively attached to the tongue (21) for adjusting an angle of the tongue (21) along the first substantially vertical axis c with respect to the frame (11) between (i) an operating position (see FIG. 3), whereby the wheels of the prime mover (1) are to one side of the cutters (17) as the mower (10) is towed through a field in a forward direction so that the wheels of the towing prime mover (1) do not pass over the crop being cut by the cutters (17) as the mower (10) is being used to cut crops, and (ii) a transport position (see FIGS. 1 and 2) whereby the angle of the tongue (21) with respect to the frame (11) is such that the wheels of the prime mover are in front of the cutters (17).

Figure 12:
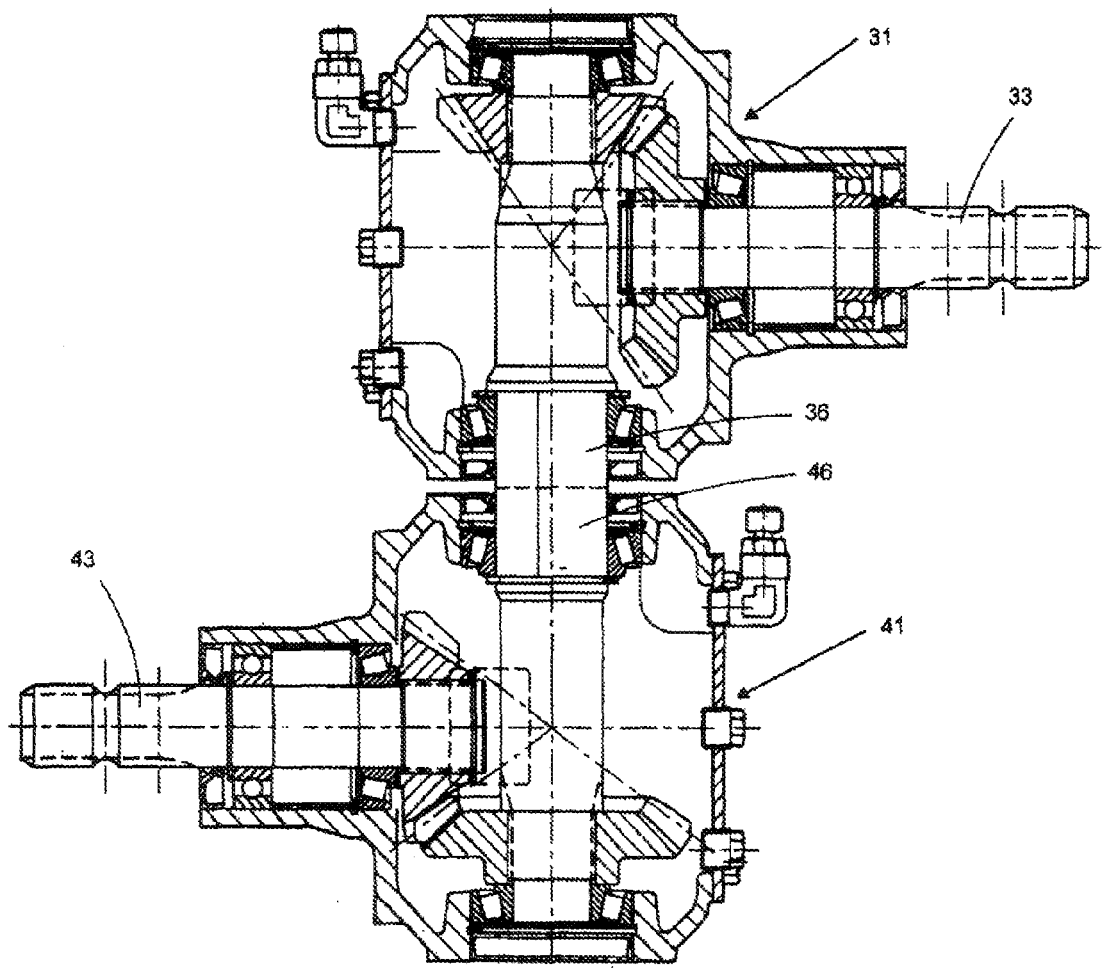
FIG. 12 is a cross sectional view taken along line 12-12 of FIG. 8 of two gearboxes, one below the other one, attached to a front part of the tongue.

A first gearbox (31) is operatively rigidly attached to the tongue (21) by use of a bracket (32) with portions (32t) and (32b) on the top and the bottom of the tongue (21) as can best be seen in FIGS. 8-11. The first gearbox (31) has a rotary input shaft (33) best seen in FIGS. 8 and 12, adapted to be attached to a power take off (35) of the prime mover (1), as shown in FIG. 1, and a rotary output shaft (36) as shown in FIG. 12 rotatable about a second substantially vertical axis a, shown in FIG. 5, whereby rotary power from the power take off (35) of the prime mover will transmit rotary power to the rotary input shaft (33) of the first gearbox (31) via shaft (37) which has unnumbered universal joints connected to each end thereof. This arrangement is well known from a variety of machines including round balers, and is configured to position the first gearbox a distance from the PTO shaft of the towing unit such that the length of the driveline is adequate to allow proper operation with as the towing unit turns to different positions. This arrangement typically uses a special type of a universal joint known as a CV (constant velocity) joint attached directly to the PTO shaft of the towing unit. CV joints are used to allow typical misalignments, while maintaining a consistent output rpm, and are an accepted component for agricultural equipment. Thus, the driveline includes a CV joint on the end that attaches to the PTO shaft of the towing unit, and a standard universal joint on the end that attaches to the first gearbox. In this way the rotary power is transferred from the PTO shaft of the towing unit (35) to the input shaft (33) and then transmitted by the first gearbox (31) to the rotary output shaft (36) of the first gearbox (31). The housing of the first gearbox (31) is rigidly mounted to the tongue (21) at the front portion of the tongue such that it is a proper distance from the hitch point.

The forces required to tow the machine are all transferred directly from the drawbar of a towing unit through hitch 24 to the frame 11, without being transferred through any portion of the driveline.

A second gearbox (41) is operatively pivotally attached to the first gearbox (31) about the second substantially vertical axis a, the second gearbox (41) has a rotary input shaft (46) which can be in one piece with rotary output shaft (36) of the first gearbox (31) or rotary input shaft (46) and rotary output shaft (36) can be separate shafts connected together, it being noted that claiming these shafts separately is meant to include inter alia a one or two piece shaft construction between gearboxes (31) and (41). Whether shafts (36) and (37) are connected together later or manufactured in one piece at the outset is clearly equivalent.

Referring to FIG. 12, it is noted that the rotary input shaft (46) of the second gearbox (41) is operatively attached to the rotary output shaft (36) of the first gearbox (31) thereby transmitting rotary power from the rotary output shaft (36) of the first gearbox (31) to the rotary input shaft (36) of the second gearbox (41) for causing the rotary output shaft (43) of the second gearbox (41) to rotate.

A third gearbox (51) is operatively pivotally attached to the header (13) about a third substantially vertical axis b as shown in FIG. 5, the third gearbox (51) having a rotary input shaft (53) and a rotary output shaft (56), the rotary output shaft (56) being operatively attached to the cutters (17) through double universal joint (57) for causing the cutters (17) to move in a cutting manner, which is a rotary motion in the embodiment shown. Looking to FIGS. 5a and 5c, a double universal joint (57) connects the output shaft (56) of the third gearbox (51) to the input shaft (58) of the cutter bar (17), which cutter bar structure can be of any one of many well known cutter bars which do not form part of this invention per se.

Figure 5B:
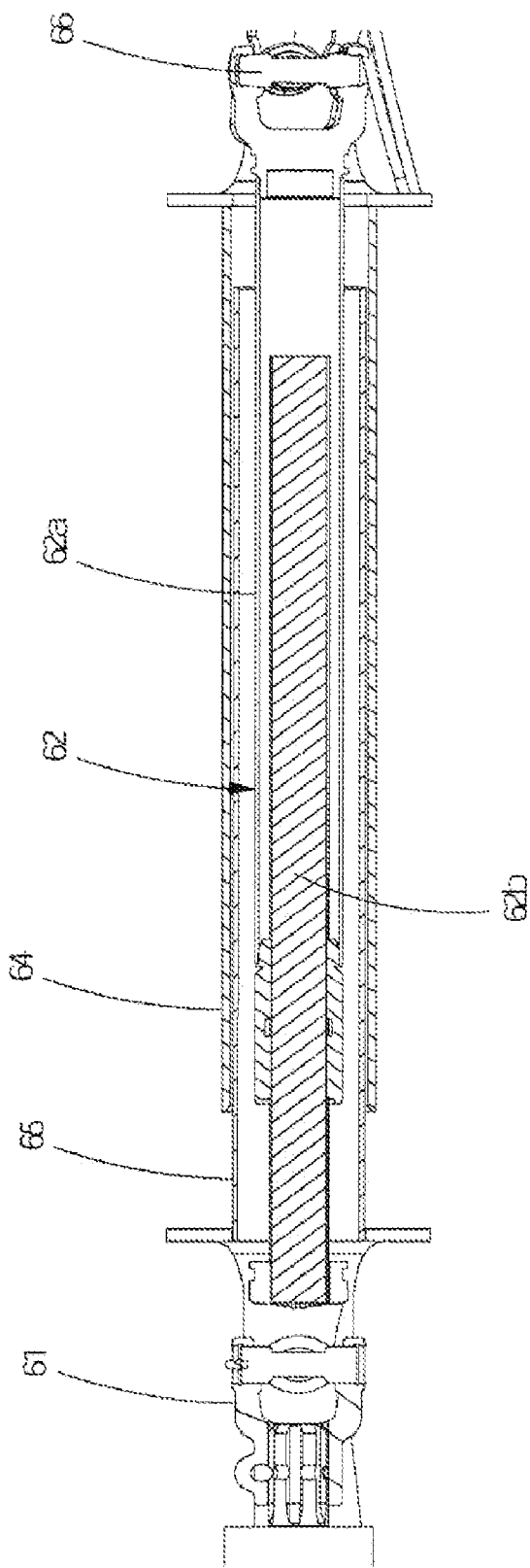
FIG. 5b is a cross sectional view along line 5B-5B through the rotational axis of the telescoping driveline between the two U-joints connecting the lower front gearbox and the rear gearbox.

Looking to FIGS. 1 and 5b, a first universal joint (61) is operatively attached to the rotary output shaft (43) of the second gearbox (41). A telescoping driveline (62), comprising an outer sleeve (62a) and a complementary shaped inner shaft (62b), is operatively attached to the first universal joint (61) at a front end thereof. For example the sleeve (62a) could be square in cross section and the shaft (62b) square in cross section so the shaft (62b) can slid in or out in the sleeve (62a) to permit the two parts to transmit rotary power while also being able to automatically adjust the length thereof as needed.

Extending around the telescoping driveline (62) is a gearbox steering device which in a preferred embodiment includes two telescoping tubes (64) and (65) which serve two purposes. Primarily the two telescoping tubes (64) and (65) serve to steer the second and third gear boxes (41) and (51) as the tongue (21) pivots with respect to the frame (11). Secondly, the two telescoping tubes (64) and (65) serve as a safety shield to help prevent anything, such as clothing, from wrapping around the driveshaft parts (62a) and (62b) as they rotate. The two telescoping tubes (64) and (65) are preferably round in cross section as is typical for guards that encompass drive shafts in agricultural equipment.

Looking to FIGS. 1-5 and 5a, it can be seen that the two telescoping tubes (64) and (65) do not rotate, tube (64) being bolted along a horizontal pivotal axis (e) to bracket (71) that is connected rigidly to the bracket surrounding gearbox three (51). Similarly, tube (65) is bolted along a horizontal pivotal axis (d) to bracket (72) which is rigidly attached to gearbox two (32).

The telescoping drive line (62), at the rear end thereof, is connected to a second universal joint (66) and to the rotary input shaft (53) of the third gearbox (51) whereby rotary power from the rotary output shaft (43) of the second gearbox (41) will be transmitted through the first universal joint (61), the telescoping driveline (62), the second universal joint (66), the rotary input shaft (53) of the third gearbox (51) to the output shaft (56) of the third gearbox (51) to cause the cutting movement of the cutters (17).

Figure 6:
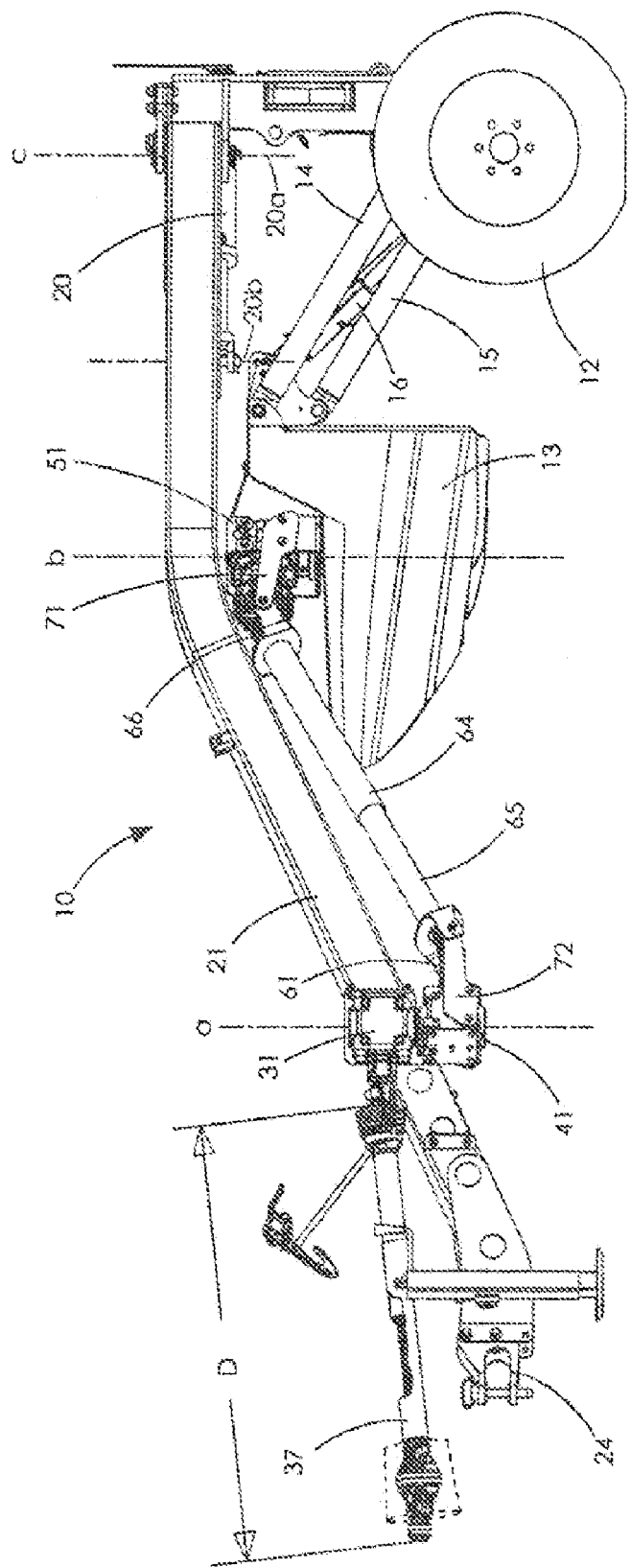
FIG. 6 is a left side elevational view with the tongue swung out and the cutter bar raised.
Figure 7:
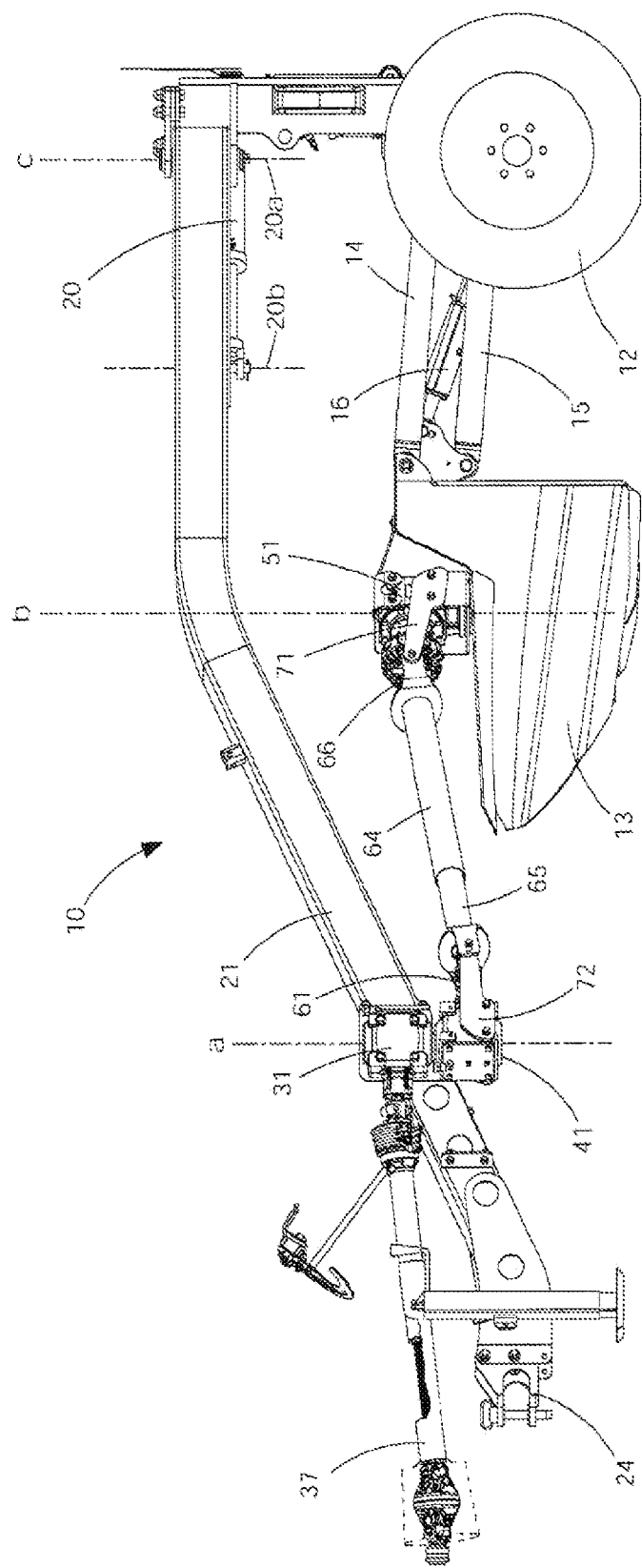
FIG. 7 is a left side elevational view with the tongue swung out and the cutter bar lowered.
Figure 8:
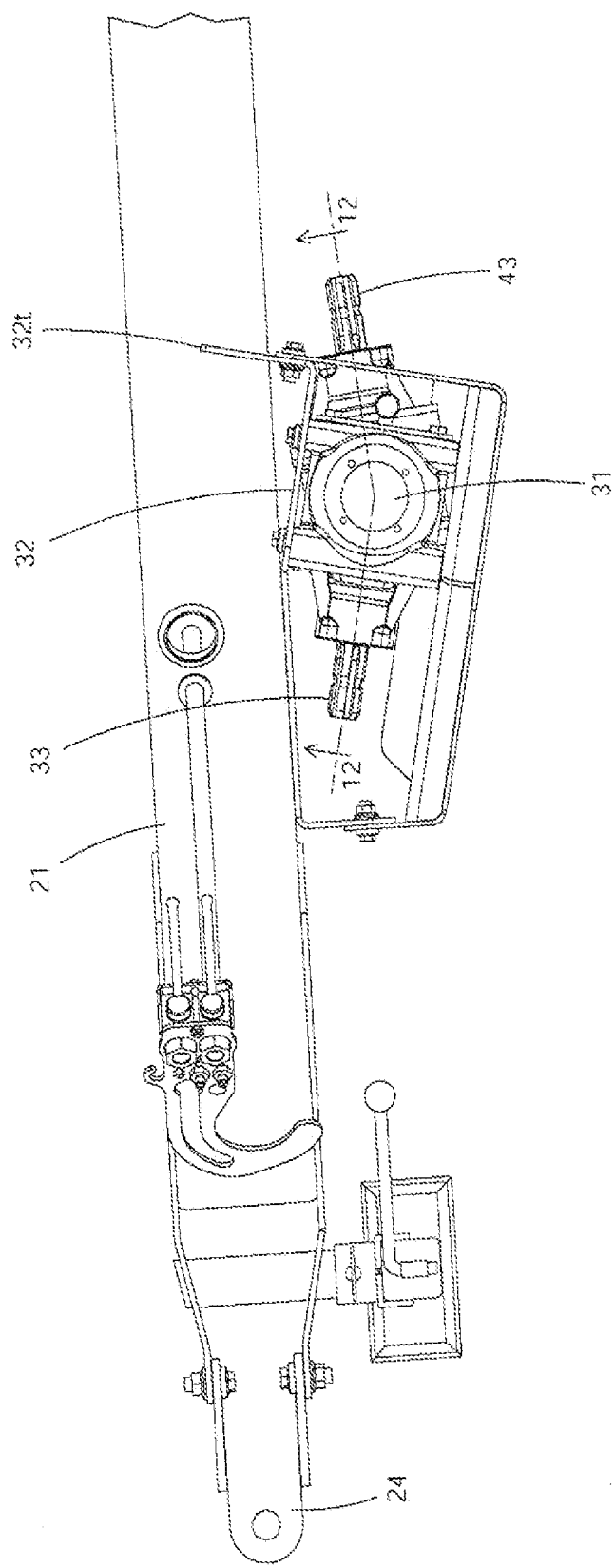
FIG. 8 is an enlarged partial top plan view showing a front part of the tongue and how the first front top gearbox is attached to the tongue.
Figure 9:
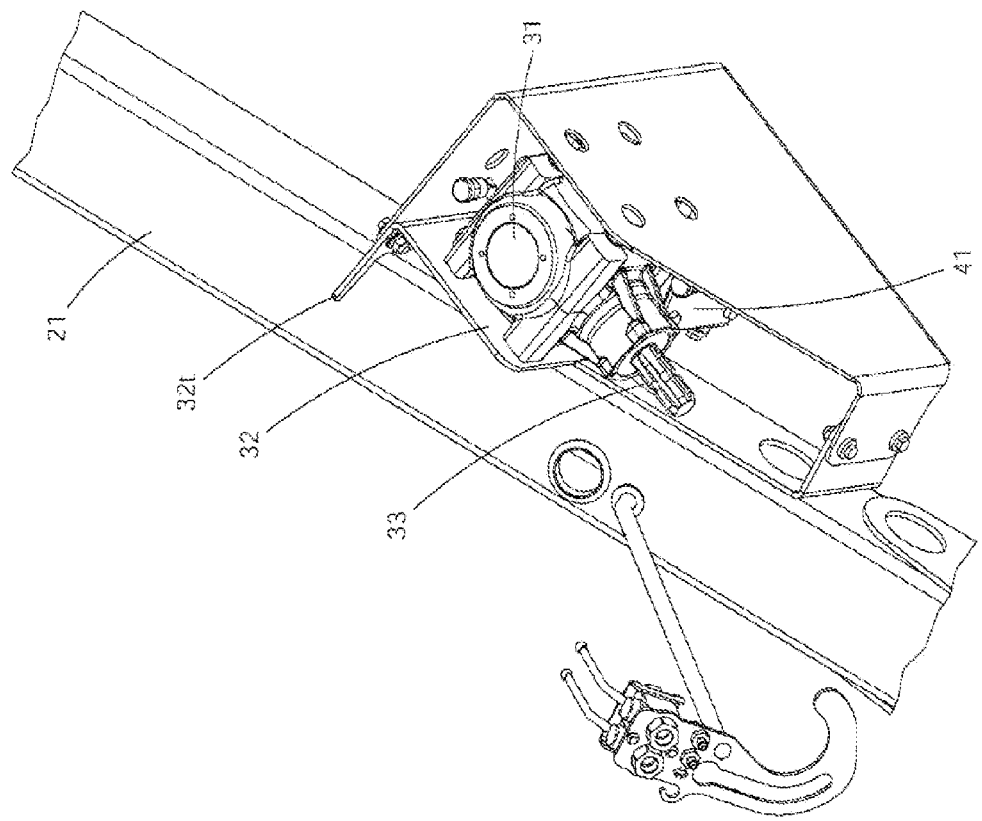
FIG. 9 is an enlarged partial perspective view showing the front part of the tongue and how the first front top gearbox is attached to the tongue.
Figure 10:
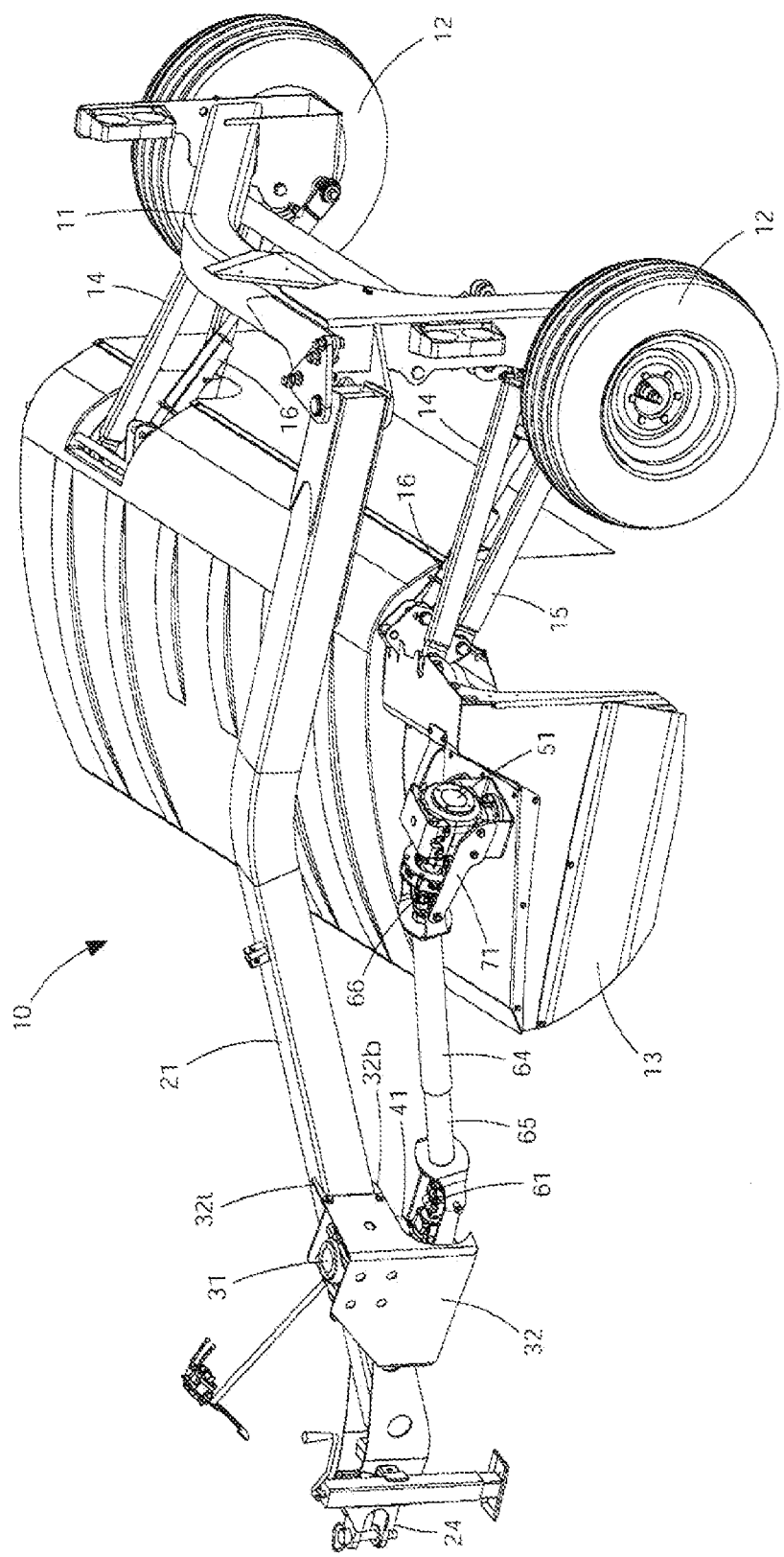
FIG. 10 is a perspective view of the embodiment of FIGS. 1-9 with the tongue swung in to the transport position thereof.
Figure 11:
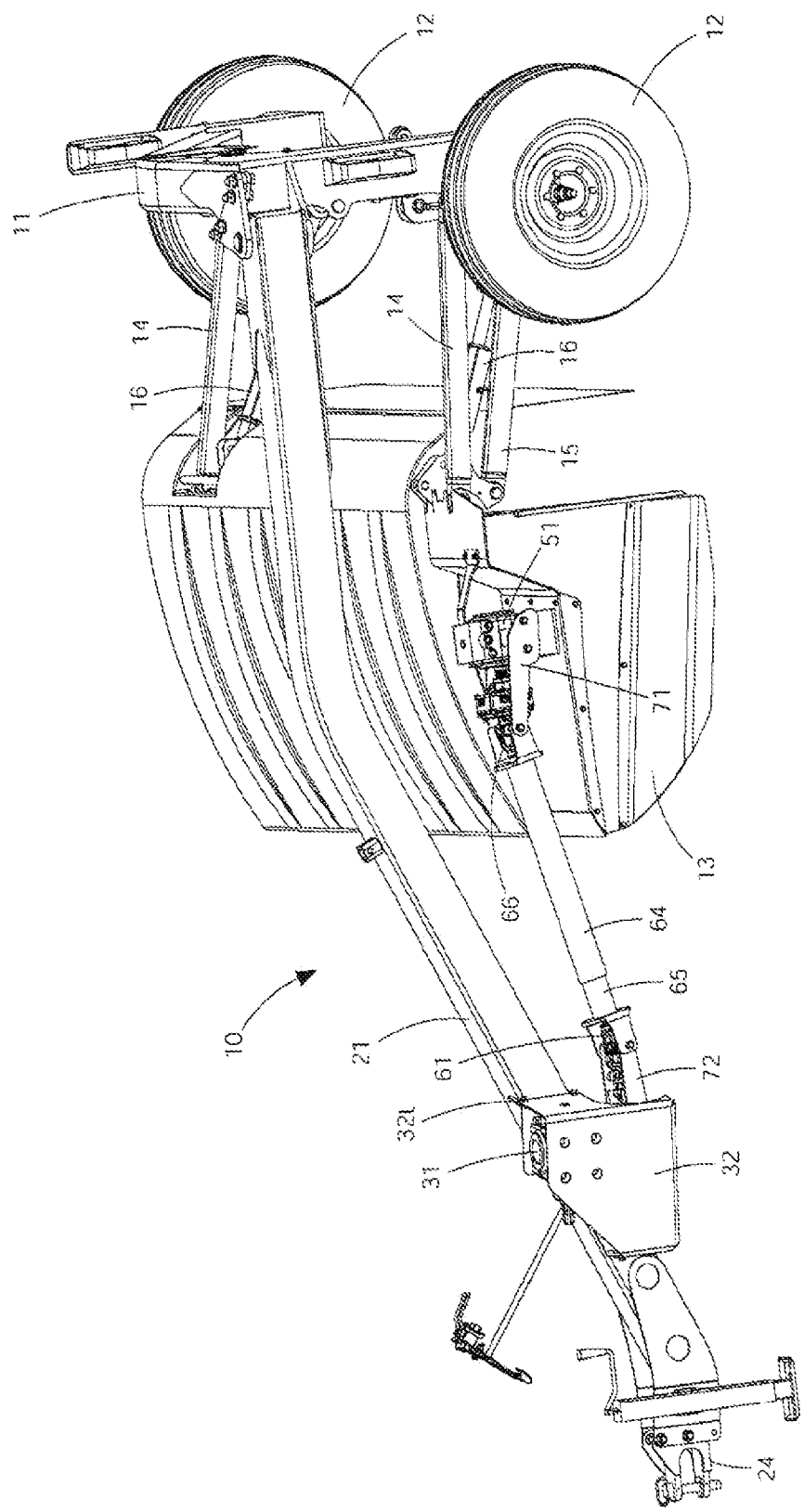
FIG. 11 is a perspective view of the embodiment of FIGS. 1-9 with the tongue swung out to the operational crop cutting position thereof.

Drive shaft 37 shown in FIG. 6, dimension D, is a minimum of thirty (30) inches. The advantage of using a longer driveline than those used in the prior art for the present invention is that the angles that the joints are subjected to are reduced, as compared to shorter drivelines. With this minimum length of 30 inches it is known that a front CV is capable of withstanding those angles. If a shorter driveline were to be used, the durability of the CV would be adversely affected.

In operation, with the mower/conditioner (10) attached to the tractor (1) as shown in FIG. 1, the mower/conditioner (10) can be towed from place to place, including on public roads, because a hydraulic cylinder (20) pivotally attached to the frame (11) along a vertical axis (20a) and to the tongue (21) at vertical axis (20b) is shortened to pull the tongue (21) to the transport position shown in FIG. 1. Of course when that occurs, the second and third gearboxes (41 and 51) will pivot along vertical axes (a) and (b) respectively. The input/output shafts and associated unnumbered gears shown in FIGS. 5a, 5c and 12 accommodate such pivoting along vertical axes (a) and (b). In the towing position of FIG. 1 the header (13) would also be raised to the position shown in FIG. 4 by lengthening the hydraulic cylinders (16) to pivot upper and lower links (14) and (15).

Figure 3:
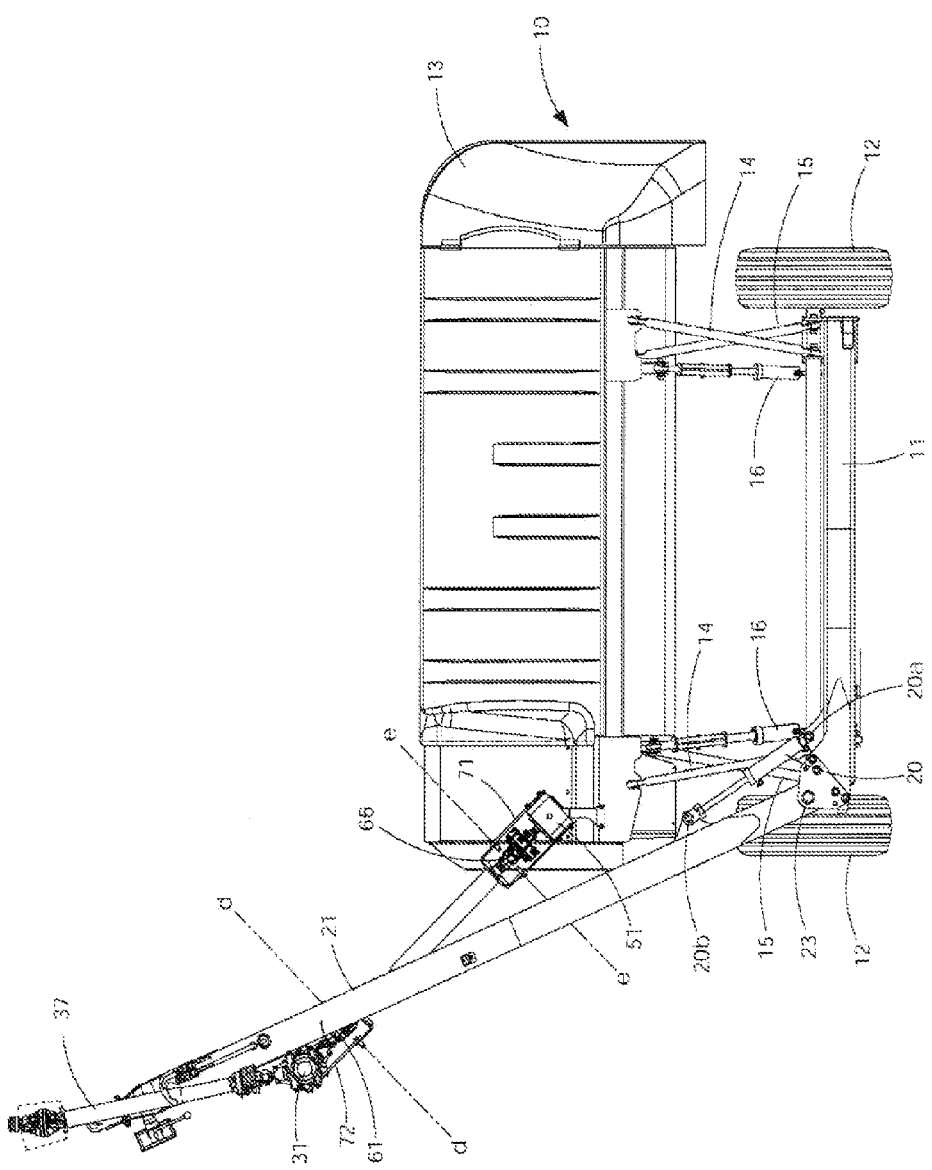
FIG. 3 is a top enlarge view like FIG. 3 but with the tongue swung out so that it can cut and windrow a crop without the crop being first driven over by the towing tractor.

After the mower/conditioner (10) is towed to a field where it is to be used to cut and windrow a crop, hydraulic cylinder (20) is lengthened to the position shown in FIG. 3 so that the towing vehicle's tires are to the left of the crop in front of the mower/conditioner (10) so the tires of the towing vehicle (1) will not smash down the crop and make it difficult to cut. In the towing position of FIG. 3 the header (13) would also be lowered to the position shown in FIG. 5 by shortening the hydraulic cylinders (16) to pivot upper and lower links (14) and (15). It can be seen in the drawings that the second and third gearboxes (31) and (41) are automatically moved or steered up/down/left/right when all of this adjusting between a transport position and an operation position is done.

Referring now to an alternate embodiment 100 in FIGS. 13, 14 and 15, the front gearboxes (31) and (41) of the FIGS. 1-12 embodiment are replaced with a normal increaser front gearbox (131) with an input shaft (133) for attachment to the drive shaft (37) via a u-joint as in FIG. 1, the input shaft (133) being disposed along a rotational axis (f) and an output shaft (136) that is disposed along a rotational axis (g) that is preferably parallel to the rotational axis (f) but is not required to be parallel to the axis (f).

The rear gear box (51) and everything shown in FIGS. 5a and 5c are still the same on this alternate embodiment (100). U-joints (61) and (66) can still be used for example. This alternate embodiment (100) of FIGS. 13 and 14 is steered by a telescoping link (168) with a first member (164) having a spherical ball joint (166) on one end thereof mounted to the top of the front gearbox (131) and a second telescoping member (165) that the first member (164) extends into. This is a similar to the setup of the FIGS. 1-12 embodiment except the spherical ball joint (166) is attached to the front gearbox (131) instead of using the telescoping steering members (64) and (65) shown in FIGS. 1-7. This can optionally eliminate the need for a CV u-joint for the rear gearbox (51) and the front one (61) is not as critical so a standard u-joint could be used there. The same telescoping drive linkage (62), including receiver (62a) having complementary shaft (62b) extending therein as shown in FIG. 5b would be used but without the telescoping steering tubes (64) and (65) which have been replaced by telescoping steering tubes (164) and (165). The rear end of steering tube (65) has a bracket (167) rigidly attached thereto, which bracket (167) is pivotally attached along a substantially horizontal axis (h) to the housing of gearbox (51). Gearbox (51) still pivots about vertical axis (c) as shown in FIG. 6, for example, using the same structure shown in FIGS. 5a and 5c, for example. The solid line structure of the second embodiment shown in FIG. 13 can be placed into the mower of FIGS. 1-5 and 6-11 to replace all of the gearboxes 31, 41 and 51 and the structure connecting gearboxes 41 and 51 and such the solid line structure of FIG. 13 is hereby incorporated into FIGS. 1-11 by reference.

FIG. 15 shows that the telescoping drive shaft (62) is square in cross section, but it could be of any cross sectional shape that is not circular, such as using a splined shaft (62b) that would extend into a complementary shaped opening in shaft (62a).

Figure 16:
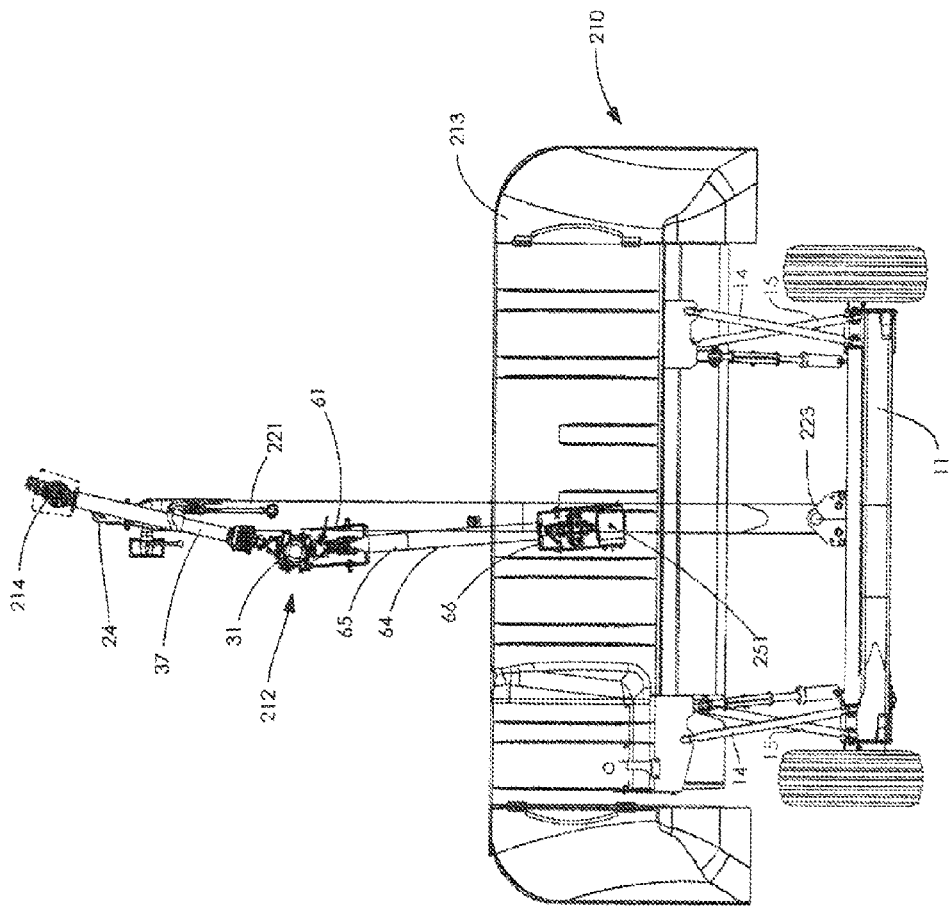
FIG. 16 shows a third embodiment that utilizes the driveline arrangement of the first embodiment, with a different configuration of the tongue and mower header, in a center pivot arrangement, where the tongue is connected to the middle of the machine, and the mower is able to swing off to either side, to mow on either side of the towing unit.

FIG. 16 shows a mower (210) with a header (213) configured to operate when positioned to either the right side, or the left side of a towing vehicle. A header (213) is operatively attached to the frame (11) by top links (14) and bottom links (15) for example in the way shown in U.S. Pat. No. 7,726,109 in FIGS. 8-12b, which patent is incorporated herein in its entirety. The mower can be positioned by rotating tongue (221) about the axis of pin (223). The rotational drive for the mower is transferred from the towing vehicle to the mower using the automatically steered gearboxes of the present invention including a front swivel gear box assembly (212) and a rear gearbox (251).

The front swivel gearbox assembly (212) is comprised of an upper gearbox (31) and a lower gearbox (41), as shown in greater detail in FIG. 12. Gearbox (31) is located at a distance from the hitch (24), mounted directly to the tongue (21), and positioned such that the first shaft assembly (37) is a minimum length of 30 inches. This shaft, which is also known as a driveline, is a variable length member, configured to allow variation of the distance and relative angles between the power take off (PTO) shaft of the towing vehicle and the input shaft (33) of the first gearbox. These variations occur as the machine is towed over variations in the terrain and around corners. With this minimum length, and a maximum length of 120 inches, a standard CV joint (214) can be used at the front of the shaft (37), where the shaft connects to the PTO shaft of the towing vehicle. The rear of the shaft (37) is connected to the input shaft (33) of gearbox (31) with a U-joint. While CV joints are preferred where mentioned in this document, regular U-joints can be used instead and are considered fully equivalent structures. The housing of the upper gearbox is oriented so that the axis of the input shaft (33) is approximately parallel to the axis of the driveline (37) in the top view of FIG. 16, with the mower positioned directly behind the towing vehicle. As the mower is swung to either the left side or the right side, the driveline and input shaft will be repositioned into a non-parallel relationship, and so will have an angular offset. The angular offset is determined by the length of the shaft (37), which is set by the position of the gearbox (212), the length of the tongue (221), and the width of the mower. The angular offset, if kept to an acceptable maximum, will not affect the performance of the machine, and a standard U-joint will be capable of providing acceptable performance. If the angular offset is too large for a standard U-Joint, then a second CV joint could be used in place of the U-joint.

The rest of the drive is the same as described in the other embodiments, with the rotary power transferred through the swivel gearbox (212), from gearbox (31), to gearbox (41), then to the first universal joint (61) of the telescoping driveline (62), then to the second universal joint (66) which is attached to the input shaft (53) of gearbox (251). With this configuration the steerable gearboxes of the present invention can be configured for use with a mower that can operate while swung to either the left or the right side.

While only exemplary embodiments of the invention have been described in detail above, many modifications are possible without materially departing from the novel teachings and advantages of this invention. Accordingly, all such modifications are intended to be included within the scope of this invention as defined in the following claims.

The invention claimed is:

1. An implement comprising:
    a. a frame;
    b. a tongue having a front end, a back end and having a hitch point at the front end thereof and being operatively pivotally connected to the frame at the back end thereof;
    c. an implement operatively attached to the frame;
    d. a first gearbox rigidly attached to the tongue, the first gearbox having an input shaft and an output shaft;
    e. a second gearbox having an input shaft operatively attached to the output shaft of the first gearbox, the second gearbox having an output shaft; and
    f. a third gearbox having an input shaft and an output shaft, the output shaft of the third gearbox being disposed for rotation about an axis, the third gearbox being operatively pivotally mounted to the implement about the axis of rotation of the output shaft of the third gearbox;
    g. a variable length driveline assembly operatively attached to the output shaft of the second gearbox at one end thereof and operatively attached to the input shaft of the third gearbox at the other end thereof; and
    h. a variable length steering link operatively attached at one end to the housing of the second gearbox and at the other end to the housing of the third gearbox.

2. The implement of claim 1 wherein the implement is a mower.

3. The implement of claim 1 wherein the implement is a mower conditioner.

4. The implement of claim 1 wherein the second gearbox is operatively pivotally mounted to the first gearbox by virtue of the operative connection of the input shaft of the second gearbox to the output shaft of the first gearbox.

5. The implement of claim 1 wherein the output shaft of the first gearbox and the input shaft of the second gearbox are one piece.

6. The implement of claim 1 wherein the rotary axis of the output shaft of the second gearbox and the rotary axis of the input shaft of third gearbox are always disposed in a common vertical plane.

7. The implement of claim 1 further comprising a second variable length driveline operatively attached at one end to the input shaft of the first gearbox and adapted to be attached to a power take off of a towing vehicle at the other end thereof.

8. An agricultural implement with a rotary driveline and frame that is configured to operate in a variety of positions comprising:
    a. a frame;
    b. a tongue having a hitch point at its front end and that is pivotally connected to the frame at its back end;
    c. an implement connected to the frame with a linkage that allows the implement to move relative to the frame;
    d. a swivel gearbox assembly with an upper gearbox that is attached rigidly to the tongue at a location near the front end and a lower gearbox that is pivotally connected to and supported by the upper gearbox;
    e. a rear gearbox that is pivotally mounted to the implement;
    f. a first driveline assembly having a first variable length drive shaft with a U-joint at a first end for connection to the PTO shaft of a towing unit and a U-joint at a second end for connection to an input shaft of the swivel gearbox assembly; and
    g. a second driveline assembly with a second variable length drive shaft having U-joints on each end, with one end connected to the output shaft of the swivel gearbox and the other end connected to the input shaft of the rear gearbox and also having a variable length cylindrical shield structure that is substantially coaxial with the drive shaft that is pivotally connected to the gearbox housing of the lower gearbox on one end and pivotally connected to the gearbox housing of the rear gearbox on the other end.

9. The implement of claim 8 wherein the first variable length driveline has a minimum length of thirty inches.

10. The implement of claim 8 wherein the U-joint of the first variable length drive shaft with a U-joint at a first end is a CV joint.

11. The implement of claim 8 wherein the rotary axis of the output shaft of the lower gearbox and the rotary axis of the input shaft of rear gearbox are always disposed in a common vertical plane.

12. The implement of claim 8 further comprising a second variable length driveline operatively attached at one end to the input shaft of the upper gearbox and adapted to be attached to a power take off of a towing vehicle at the other end thereof.

13. A mower with an automatically steered gearbox comprising:
a frame with wheels operatively attached thereto for permitting the frame to be towed from place to place;
a header operatively attached to the frame;
cutters operatively attached to the header for cutting plants;
a tongue operatively pivotally attached along a first substantially vertical axis to the frame at one end thereof and adapted to be attached to a prime mover at the other end thereof;
a front gearbox is operatively attached to the tongue, the front gearbox having a rotary input shaft about an axis (f), the input shaft of the front gearbox being adapted to be attached to a power take off of the prime mover and a rotary output shaft rotatable about a second axis (g) whereby rotary power from the power take off of the prime mover will transmit rotary power to the rotary input shaft of the front gearbox and that rotary power is transmitted by the front gearbox to the rotary output shaft of the front gearbox;
a rear gearbox is operatively pivotally attached to the header about a substantially vertical axis, the rear gearbox having a rotary input shaft and a rotary output shaft, the rotary output shaft of the rear gearbox being operatively attached to the cutters for causing the cutters to move in a cutting movement;
a telescoping driveline operatively attached to the at a front end thereof to the output shaft of the front gearbox, the telescoping drive line also having a rear end;
the rear end of the telescoping driveline being operatively attached to the rotary input shaft of the rear gearbox whereby rotary power from the rotary output shaft of the front gearbox will be transmitted through the telescoping driveline and the rotary input shaft of the rear gearbox to the output shaft of the rear gearbox to thereby cause the cutting movement of the cutters;
an actuator operatively attached to the frame and operatively attached to the tongue for adjusting an angle of the tongue along the first substantially vertical axis with respect to the frame between (1) an operating position, whereby the wheels of the prime mover are to one side of the cutters as the mower is towed through a field in a forward direction so that the wheels of the towing prime mover do not pass over the crop being cut by the cutters as the mower is being used to cut crops, and (2) a transport position whereby the angle of the tongue with respect to the frame is such that the wheels of the prime mover are in front of the cutters; and
a gearbox steering device attached at a front end thereof to the front gearbox and operatively pivotally attached at the rear thereof to the rear gearbox about a substantially horizontal axis (h).

14. The mower of claim 13 wherein a four bar linkage is operatively attached to the frame and to the header for operatively attaching the header to the frame to permit the header to move between a lowered cutting position and a raised transport position.

15. The mower of claim 13 wherein the actuator comprises a hydraulic cylinder.

16. The mower of claim 13 wherein the gearbox steering device comprises telescoping tubes.

17. The mower of claim 13 wherein the attachment of the gearbox steering device to the first gearbox comprises a spherical joint.

18. The implement of claim 13 wherein the rotary axis of the rotary output shaft of the front gearbox and the rotary axis of the input shaft of the rear gearbox are always disposed in a common vertical plane.

19. The implement of claim 13 further comprising a second variable length driveline operatively attached at one end to the input shaft of the front gearbox and adapted to be attached to the power take off of the prime mower at the other end thereof.

20. A mower with automatically steered gearboxes comprising:
a frame with wheels operatively attached thereto for permitting the frame to be towed from place to place;
a header operatively attached to the frame;
cutters operatively attached to the header for cutting plants;
a tongue operatively pivotally attached along a first substantially vertical axis to the frame at one end thereof and adapted to be attached to a prime mover at the other end thereof;
a first gearbox operatively attached to the tongue, the first gearbox having a rotary input shaft adapted to be attached to a power take off of the prime mover and a rotary output shaft rotatable about a second substantially vertical axis whereby rotary power from the power take off of the prime mover will transmit rotary power to the rotary input shaft of the first gearbox and that rotary power is transmitted by the first gearbox to the rotary output shaft of the first gearbox;
a second gearbox operatively pivotally attached to the first gearbox about the second substantially vertical axis, the second gearbox having a rotary input shaft and a rotary output shaft, the rotary input shaft of the second gearbox being operatively attached to the rotary output shaft of the first gearbox thereby transmitting rotary power from the rotary output shaft of the first gearbox to the rotary input shaft of the second gearbox for causing the rotary output shaft of the second gearbox to rotate;
a third gearbox operatively pivotally attached to the header about a third substantially vertical axis, the third gearbox having a rotary input shaft and a rotary output shaft, the rotary output shaft being operatively attached to the cutters for causing the cutters to move in a cutting movement;
a first universal joint operatively attached to the rotary output shaft of the second gearbox;

a telescoping driveline operatively attached to the first universal joint at a front end thereof, the telescoping drive line also having a rear end;

a second universal joint operatively attached to the rear end of the telescoping driveline and to the rotary input shaft of the third gearbox whereby rotary power from the rotary output shaft of the second gearbox will be transmitted through the first universal joint, the telescoping driveline, the second universal joint, the rotary input shaft of the third gearbox to the output shaft of the third gearbox to cause the cutting movement of the cutters;

an actuator operatively attached to the frame and operatively attached to the tongue for adjusting an angle of the tongue along the first substantially vertical axis with respect to the frame between (1) an operating position, whereby the wheels of the prime mover are to one side of the cutters as the mower is towed through a field in a forward direction so that the wheels of the towing prime mover do not pass over the crop being cut by the cutters as the mower is being used to cut crops, and (2) a transport position whereby the angle of the tongue with respect to the frame is such that the wheels of the prime mover are in front of the cutters; and a gearbox steering device operatively pivotally attached to the second gearbox along a first substantially horizontal axis (d) and pivotally attached to the second gearbox about a second substantially horizontal axis (e) to the third gearbox.

21. The mower of claim 20 wherein a four bar linkage is operatively attached to the frame and to the header for operatively attaching the header to the frame to permit the header to move between a lowered cutting position and a raised transport position.

22. The mower of claim 20 wherein the actuator comprises a hydraulic cylinder.

23. The mower of claim 20 wherein the rotary input shaft of the third gearbox has a rotary axis coincident with the third substantially vertical axis.

24. The mower of claim 20 wherein the gearbox steering device comprises telescoping members.

25. The mower of claim 24 wherein the telescoping members are telescoping tubes that surround at least a portion of the telescoping driveshaft.

26. The implement of claim 20 wherein the rotary axis of the output shaft of the second gearbox and the rotary axis of the input shaft of third gearbox are always disposed in a common vertical plane.

27. The implement of claim 20 further comprising a second variable length driveline operatively attached at one end to the input shaft of the first gearbox and adapted to be attached to a power take off of a towing vehicle at the other end thereof.

28. A method of steering a rear gearbox on a mower of a type comprising a frame with wheels operatively attached thereto for permitting the frame to be towed from place to place, a header operatively attached to the frame, cutters operatively attached to the header for cutting plants, a tongue operatively pivotally attached along a first substantially vertical axis to the frame at one end thereof and adapted to be attached to a prime mover at the other end thereof, a front gearbox is operatively attached to the tongue, the front gearbox having a rotary input shaft rotatable about an axis, the input shaft of the front gearbox being attached to a power take off of the prime mover and a rotary output shaft rotatable about a second axis whereby rotary power from the power take off of the prime mover will transmit rotary power to the rotary input shaft of the front gearbox and that rotary power is transmitted by the front gearbox to the rotary output shaft of the front gearbox, the rear gearbox is operatively pivotally attached to the header about a substantially vertical axis, the rear gearbox having a rotary input shaft and a rotary output shaft, the rotary output shaft of the rear gearbox being operatively attached to the cutters for causing the cutters to move in a cutting movement; a telescoping driveline operatively attached to the at a front end thereof to the output shaft of the front gearbox, the telescoping drive line also having a rear end, the rear end of the telescoping driveline being operatively attached to the rotary input shaft of the rear gearbox whereby rotary power from the rotary output shaft of the front gearbox will be transmitted through the telescoping driveline and the rotary input shaft of the rear gearbox to the output shaft of the rear gearbox to thereby cause the cutting movement of the cutters and an actuator operatively attached to the frame and operatively attached to the tongue for adjusting an angle of the tongue along the first substantially vertical axis with respect to the frame between (1) an operating position, whereby the wheels of the prime mover are to one side of the cutters as the mower is towed through a field in a forward direction so that the wheels of the towing prime mover do not pass over the crop being cut by the cutters as the mower is being used to cut crops, and (2) a transport position whereby the angle of the tongue with respect to the frame is such that the wheels of the prime mover are in front of the cutters, the method comprising:

operatively attaching a gearbox steering device at a front end thereof to the front gearbox and operatively pivotally attaching the gearbox steering device at the rear thereof to the rear gearbox about a substantially horizontal axis whereby when the tongue is pivoted with respect to the frame, the rear gearbox and the telescoping driveline are pivoted accordingly to maintain operational alignment of the front and rear gearboxes.

29. The implement of claim 28 wherein rotary axis of the rotary output shaft of the front gearbox and the rotary axis of the input shaft of the rear gearbox are always maintained in a common vertical plane.

* * * * *